UNITED STATES PATENT OFFICE.

FRANK SILVER, OF SAN FRANCISCO, CALIFORNIA, ASSIGNOR OF ONE-HALF HIS RIGHT TO ALEXANDER P. ADAMS, OF SAME PLACE.

IMPROVEMENT IN PROCESSES OF PREPARING COFFEE.

Specification forming part of Letters Patent No. 191,378, dated May 29, 1877; application filed January 31, 1876.

*To all whom it may concern:*

Be it known that I, FRANK SILVER, of San Francisco city and county, State of California, have invented an Improved Method of Preparing Coffee; and I do hereby declare the following description sufficient to enable any person skilled in the art or science to which it most nearly appertains to make and use my said invention without further invention or experiment.

My invention relates to certain improvements in preparing coffee or tea so as to increase their qualities and maintain them for a long time, fit them for transportation, and prevent all loss of aroma by long storage.

My present invention is an improvement upon a process for which Letters Patent were granted to myself and August Eikenenkother September 3, 1867.

In this former process sugar was melted over a fire and the coffee (reduced to an impalpable powder) was stirred in, in equal quantity, the thickened mixture being then made into cakes. This process I have found impracticable: first, because when the coffee is ground so fine, it cannot be cleared for use after the preparation is dissolved; secondly, that the compound prepared in this manner will always be sticky and cannot be preserved; and, lastly, that it cannot be put up into packages for transportation or sale.

My improved process consists in the preparation of sugar by burning or roasting it until all the flavor or sweetness is destroyed, and the sugar resembles burnt coffee in color and taste. The coffee is also burned and ground to the fineness of coarse meal, and the two are then thoroughly mixed and subjected to a powerful pressure in molds, thus forming it into dry solid cakes, the flavor of the whole mass being that of coffee, and a considerable increase in bulk being obtained.

In order to properly carry out my process I mix Java and Costa Rica coffee in equal parts, and, after browning, I grind them coarsely. Sugar is taken in the proportion of one part to three of the coffee, and this is burned or roasted until the sweetness is entirely destroyed and the appearance of the mass is like that of burnt coffee. The two substances are then mixed by rolling or triturating until the whole is thoroughly incorporated. The mixture having been thoroughly incorporated, I then place it into molds of the proper shape and size, and subject it to powerful pressure. This solidifies and binds together the mass, which has hitherto been of a loose granular nature, and when the cakes are removed they will be found to be perfectly dry and hard enough to require a hammer or saw to divide them. In this state they will not become sticky, and can be preserved and transported to any climate, holding their aroma perfectly for years, and the mass will be increased in bulk proportionately to the amount of sugar used.

Having thus described my invention, what I claim as new, and desire to secure by Letters Patent, is—

The process herein described for preparing coffee, the same consisting in mixing it mechanically with sugar, burned as herein described, and in a granular or mealy state, in the proportions described, and then subjecting the compound to hydraulic or other pressure, substantially as and for the purpose herein described.

In witness whereof I hereunto set my hand and seal.

FRANK SILVER. [L. S.]

Witnesses:
GEO. H. STRONG,
C. M. RICHARDSON.